United States Patent [19]

Jakob

[11] Patent Number: 5,744,418

[45] Date of Patent: Apr. 28, 1998

[54] REDOX CATALYST SYSTEM FOR THE INITIATION OF EMULSION POLYMERIZATION

[75] Inventor: Martin Jakob, Kelkheim, Germany

[73] Assignee: Clariant GmbH, Frankfurt, Germany

[21] Appl. No.: 759,831

[22] Filed: Dec. 4, 1996

[30] Foreign Application Priority Data

Dec. 7, 1995 [DE] Germany ............... 195 45 609.2

[51] Int. Cl.[6] ............................................. B01J 31/00
[52] U.S. Cl. ........................ 502/160; 502/172; 526/208
[58] Field of Search .......................... 526/208; 502/160, 502/172

[56] References Cited

U.S. PATENT DOCUMENTS

| | | | |
|---|---|---|---|
| 3,438,941 | 4/1969 | Kekish | 260/67 |
| 4,094,849 | 6/1978 | Oyamada et al. | 260/29.6 |
| 4,118,357 | 10/1978 | Brabetz et al. | 260/29.6 |
| 4,360,632 | 11/1982 | Pinschmidt, Jr. et al. | 524/819 |
| 4,663,377 | 5/1987 | Homach et al. | 524/196 |
| 5,296,532 | 3/1994 | Haerzschel et al. | 524/398 |
| 5,545,684 | 8/1996 | Jakob et al. | 524/354 |

FOREIGN PATENT DOCUMENTS

| | | |
|---|---|---|
| 0 394 774 | 4/1990 | European Pat. Off. . |
| 0 623 661 | 5/1994 | European Pat. Off. . |

OTHER PUBLICATIONS

G. S. Misra et al., "Redox Polymerization", Prog. Polym. Sci., vol. 8, pp. 61–131.

R. M. Mohsen et al., "A Newly Developed Polyvinyl Acetate Emulsion Latex Adhesive Made by the Semicontinous Process", Pigment and Resin Technology, Jul./Aug. 1993, pp. 4–6, 17.

A. S. Badran et al., "Kinetics and Mechanism of the Emusion Polymerization of Vinyl Acetate by Redox Initiation", Acta Polymerica, vol. 42, No. 1, 1991, pp. 1–5.

A. S. Badran et al., "Study of the Parameters Affecting the Emulsion Polymerization of Vinyl Acetate", Acta Polymerica, vol. 41, No. 3, 1990, pp. 187–192.

A. S. Badran et al, "Emulsion Polymerization of Vinyl Actetate initiated by Potassium Persulfate–Cyclohexanone Sodium Bisulfite Redox Pair System", Journal of Polymer Science: Part a: Polymer Chemistry, vol. 28, 1990, pp. 411–424.

H. Petersen et al., "Formaldehyde–General Situation, Test Reactions, Application in High–Grade Textile Finishing", Mellian Textilberichte, vol. 66, 1985, pp. 217–222 and 285–295.

A. S. Badran et al., "Effect of Some Sodium Bisulfite Adducts of Different Chain Lengths on the Course of the Emulsion Polymerization of Vinyl Acetate", Journal of Applied Polymer Science, vol. 49, pp. 187–196.

JP 52–055709, abstract, May 1977.

JP 60–099096, abstract, Jun. 1985.

*Primary Examiner*—Joseph L. Schofer
*Assistant Examiner*—N. Sarafim
*Attorney, Agent, or Firm*—Foley & Lardner

[57] ABSTRACT

A redoxcatalyst system capable of being used for free-radical emulsion polymerization of ethylenically unsaturated compounds, comprising at least one oxidizing agent and at least one reducing agent, said reducing agent comprising an at least bifunctional aldehyde having at least 3 carbon atoms which is completely masked as a bisulfite adduct.

12 Claims, No Drawings

REDOX CATALYST SYSTEM FOR THE INITIATION OF EMULSION POLYMERIZATION

BACKGROUND OF THE INVENTION

1. Field of the Invention

The present invention relates to a novel redox catalyst system, and a process for preparing dispersions by emulsion polymerization of vinyl compounds with the aid of this catalyst system. Furthermore, the present invention is directed to dispersions, and in particular, to those based on polyvinyl esters, which have been prepared with the aid of a catalyst system of the present invention and also to the use of the dispersions as water-resistant and formaldehyde-free adhesives for porous and semiporous substrates.

2. Description of the Related Art

Redox catalyst systems are widely used for the initiation of the free-radical emulsion polymerization of vinyl compounds. Their advantages compared with single-component thermally dissociative initiators include a short induction period and a low activation energy which allows polymerization at low temperature and results in high molecular weights of the polymers. Numerous combinations of redox-catalyst systems have been described both in the scientific literature and in the patent literature. Frequently used redox pair combinations comprise the oxidizing agents hydrogen peroxide, benzoyl peroxide, alkyl hydroperoxides, peroxodisulfates on one hand. On the other hand, reducing agents such as transition metal ions may also be used. Example of reducing agents include $Fe^{2+}$, carboxylic acids such as ascorbic acid or tartaric acid, sulfur compounds such as sodium hydrogen sulfite, zinc or sodium formaldehyde sulfoxylate, and the like. Comprehensive reviews of redox polymerizations may be found in the technical literature, for example by G. S. Misra and U. D. N. Bajpai in Prog. Polym. Sci. 8, 61-131 (1982).

For preparing homopolymeric and copolymeric polyvinyl- ester dispersions, for example for the adhesives sector, use is likewise frequently made of redox catalyst systems for the initiation of the polymerization. In particular, systems which are stabilized with protective colloids such as polyvinyl alcohol may be used. This is made clear by the documents DE-A 44 20 484, which discloses tert-butyl hydroperoxide/sodium formaldehyde sulfoxylate, EP-A 0 623 661, which discloses ammonium peroxodisulfate/$Fe^{2+}$/sodium formaldehyde sulfoxylate, and DE-A 39 42 628, EP-A 0 394 774 and DE-C 26 20 738 which all disclose tert-butyl hydroperoxide/sodium formaldehyde sulfoxylate. According to DE-C 26 20 738, the use of a redoxcatalyst system, viz., tert-butyl hydroperoxide/sodium formaldehyde sulfoxylate, offers the particular advantage of an improvement in the water resistance of the film derived from the dispersions. This improvement is achieved by means of a grafting reaction of the vinyl ester onto the protective colloid polyvinyl alcohol.

The use of redox catalyst systems for preparing vinyl acetate-ethylene emulsion copolymers in which the reducing component can be a bisulfite adduct of a carbonyl compound is generally known. Examples include a ketone, glyoxal or a glyoxal derivative such as methylglyoxal or else an adduct of various further sulfur compounds with glyoxal or methylglyoxal. DE-A 32 39 212 and U.S. Pat. No. 4,360,632 describe the preparation of lattices with the aid of a formaldehyde-free redoxcatalyst system. This catalyst system comprises an oxidizing agent such as tert-butyl hydroperoxide, and a water-soluble adduct of sodium hydrogen sulfite with a ketone having from 3 to 8 carbon atoms as reducing agent, such as acetone-sodium hydrogen sulfite. The monomer system preferably used comprises vinyl acetate, ethylene and further functional comonomers.

The documents DE-A 26 49 532, JP-A 55 709/77 and JP-A 99 096/85 relate to formaldehyde-free redoxcatalyst systems which contain, apart from an oxidizing agent, reaction products of glyoxal or methylglyoxal with reducing sulfur/oxygen compounds. Examples of reducing sulfur/oxygen compounds disclosed include alkali metal, ammonium or zinc salts of thiosulfuric acid, dithionous acid, disulfurous acid, sodium hydrogen sulfite or potassium hydrogen sulfite. Specific compounds used are alkali metal hydrogen sulfite adducts of glyoxal. The polymers concerned are vinyl acetate-ethylene copolymers which may contain further crosslinkable copolymers such as n-butoxymethylacrylamide. The products are suitable as formaldehyde-free binders for nonwovens and paper, but do not-possess the desired degree with respect to water resistance can be achieved using glyoxal derivatives (See Comparative Example 1).

Furthermore, U.S. Pat. No. 3,438,941 discloses the use as a reducing agent of an adduct of sodium hydrogen sulfite and polyacrolein acidified to a pH of less than 1.5 using hydrochloric acid. These compounds are used in combination with an oxidizing mixture of ammonium persulfate and tert-butyl hydroperoxide, specifically for the emulsion polymerization of $\alpha,\beta$-unsaturated aldehydes such as acrolein. The adduct used as reducing agent simultaneously functions as stabilizer when correspondingly larger amounts are used. However, due to the low pH level, the polymerization conditions described in U.S. Pat. No. 3,438,941 are unsuitable for the polymerization of vinyl esters.

In addition, the relatively recent literature describes work on the development of redoxcatalyst systems for emulsion polymerization of vinyl esters in the presence of polyvinyl alcohol functioning as a protective colloid, particularly pure vinyl acetate. Bisulfite adducts of monofunctional carbonyl compounds are used as reducing components in combination with peroxodisulfates. In Pigment and Resin Technology, issue July/August, pp. 4–6, 17 (1993), R. M. Mohsen et al. describe the preparation of polyvinyl acetate dispersions stabilized with polyvinyl alcohol as adhesives with the aid of the redoxcatalyst system potassium peroxodisulfate/octanal (sodium hydrogen sulfite). A. S. Badran et al. describe emulsion polymerizations of vinyl acetate in the presence of polyvinyl alcohol with the aid of the various catalyst systems. Potassium peroxodisulfate/salicylaldehyde (sodium hydrogen sulfite) is described in Acta Polym. 42, 1 (1991). Potassium peroxodisulfate/ acetone(sodium hydrogen sulfite) is described in Acta Polym. 41, 187 (1990). Potassium peroxodisulfate/cyclohexanone (sodium hydrogen sulfite) is described in J. Polym. Sci. A 28, 411 (1990). Redoxcatalyst systems comprising the reducing agents benzaldehyde (sodium hydrogen sulfite), acetaldehyde-(sodium hydrogen sulfite) and (methyl propyl ketone)-(sodium hydrogen sulfite) are described by A. S. Badran et. al. in J. Appl. Polym. Sci 49, 187 (1993). A disadvantage of the use of monofunctional bisulfite adducts as reducing agents in redox systems is that, as described above with respect to many other possible-systems, such adducts are not capable of attaining the desired degree with respect to the water resistance in the gluing of wood (See Comparative Example 3).

Polyvinyl ester dispersions which are used as adhesives for semiporous and porous substrates are employed for water-resistant bonding in accordance with standards. Subsequent addition of various crosslinkers, can greatly improve the water resistance of the films derived from the polyvinyl ester dispersions, even to boiling water. In particular water resistance is increased in the presence of Lewis acids, compounds which can be complexed by the protective colloid, for example aluminum(III) salts, with the aqueous phase becoming acid. For example, masked polyfunctional aldehydes having at least 3 carbon atoms as taught by DE-A 44 20 484, which is non-prior art, can be used. In addition, the use of masked polyfunctional isocyanates as taught by EP-A 0 206 059, crosslinkable comonomers such as N-methylolacrylamide or related compounds as taught by DE-C 26 20 738, DE-A 39 42 628 and EP-A 0 394 774 or a combination of both measures as disclosed in DE-A 44 20 484 and EP-A 0 623 661 are possible.

In recent times, for toxicological reasons, efforts are being made in industry to avoid where possible the use of components which contain formaldehyde in free or bound form as depot formaldehyde which can be liberated in a crosslinking step. Examples of such components include formaldehyde resins, N-methylol(meth)acrylamide as monomer or sodium formaldehyde sulfoxylate as constituent of a redox catalyst system. This also applies to the adhesives sector and the glue sector.

SUMMARY OF THE INVENTION

It is therefore an object of the present invention to provide a redox catalyst system. It is also an object to provide dispersions and a process for preparing dispersions by emulsion polymerization of vinyl compounds with the aid of a catalyst system.

In accordance with these and other objectives, there is provided a redoxcatalyst system capable of being used for free-radical emulsion polymerization of ethylenically unsaturated compounds, comprising at least one oxidizing agent and at least one reducing agent, said reducing agent comprising an at least bifunctional aldehyde having at least 3 carbon atoms which is completely masked as a bisulfite adduct.

In further accordance with these objectives, there is provided a process for preparing polymer dispersions by emulsion polymerization of vinyl compounds comprising conducting a continuous or discontinuous free-radical polymerization employing a redox catalyst system according to the present invention.

There is also provided in accordance with the present invention, a polymer dispersion containing masked aldehyde groups which are bound to an emulsion polymer and are capable of crosslinking.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The present invention has developed a process for the very simple and inexpensive preparation of formaldehyde-free homopolymer and copolymer dispersions, particularly of polyvinyl dispersions. These dispersions are preferably stabilized with protective colloids such as polyvinyl alcohol and, if required, are suitable after addition of an acid hardener such as aluminum chloride, for water-resistant gluing of wood. In particular, dispersions prepared according to the present invention are capable of reaching the high test class D4 according to the test standard DIN EN 204 which is well known in the art.

This object is achieved by the use of a redoxcatalyst system which comprises as reducing components an at least bifunctional bisulfite adduct comprising at least one oxidizing agent and at least one reducing agent comprising an at least bifunctional aldehyde having at least 3 carbon atoms which is completely masked as bisulfite adduct.

Suitable oxidizing components of the redoxcatalyst system of the invention include basically water-soluble compounds containing at least one azo or peroxide group such as azobisisobutyonitrile, hydrogen peroxide, peroxodiphosphates, for example, ammonium, sodium and potassium peroxodiphosphate, peroxosulfates, such as ammonium, sodium and potassium persulfate, ammonium, sodium and potassium peroxodisulfate, and organic hydroperoxides, for example, alkyl hydroperoxides. The use of aliphatic alkyl hydroperoxides, particularly tert-butyl hydroperoxide, is particularly preferred. It is also possible to use mixtures of various oxidizing agents.

The at least bifunctional aldehydes having at least 3 carbon atoms which are completely masked as bisulfite adducts are used as a novel constituent of the reducing component. Examples of suitable bifunctional aldehydes include water-soluble or water-suspendable bis(alkali metal hydrogen sulfite) adducts. Examples of suitable adducts include those of malonaldehyde, succinaldehyde, 2-hydroxysuccinaldehyde, glutaraldehyde, 3-methylglutaraldehyde, 3-hydroxyglutaraldehyde, adipaldehyde, heptanedial, octanedial, nonanedial, decanedial and also cis- and trans-2-butenedial or polyadducts of alkali metal hydrogen sulfites and polyacrolein or dialdehyde starches. The adducts of sodium or potassium hydrogen sulfite and these aldehydes are preferred. Particularly preferred components include the sodium or potassium hydrogen sulfite adducts of glutaraldehyde and succinaldehyde, in particular glutaraldehydebis(sodium hydrogen sulfite) and succinaldehydebis(sodium hydrogen sulfite). It is also possible to use mixtures of various adducts.

Further reducing agents which can be combined with the at least bifunctional aldehydes having at least 3 carbon atoms which are completely masked as bisulfite adduct include transition metal ions. Examples include transition metal ions of Fe(II), Fe(III), Co(II), Mn(III), also ascorbic acid, tartaric acid, hydroxylamine, sodium phosphite, compounds such as thiourea, sodium thiosulfate, sodium and zinc salts of hydroxymethanesulfinic acid and, in particular, the salts sodium disulfite (sodium pyrosulfite), sodium sulfite and sodium hydrogen sulfite. Frequently, commercially available bisulfite adducts of at least bifunctional aldehydes may already contain small amounts of free bisulfite from production processes.

The molar ratio of the oxidizing groups in the oxidizing agent to the reducing groups in the reducing agent is preferably from 1:0.01 to 1:100. The selection of an appropriate molar ratio can depend on the material combinations used in a particular case and on the stoichiometry of the redox equations to be employed in each case. In the case of a preferred redox combinations employing tert-butyl hydroperoxide, the bisulfite adduct is preferably used in a molar ratio from 1:1 to 100:1 with respect to the oxidizing agent, and in particular, in a molar ratio of from 2:1 to 30:1.

If further reducing agents are used in addition to the bisulfite adduct of the invention, the proportion by weight of the bisulfite adducts of the at least bifunctional aldehydes is preferably at least 50% of the total mass of all reducing agents, most preferably at least 75%, and in particular at least 90%.

A particularly preferred redoxcatalyst system comprises tert-butyl hydroperoxide and glutaraldehyde bis(sodium hydrogen sulfite) or succinaldehydebis(sodium hydrogen sulfite).

The invention also provides a process for preparing polymer dispersions by emulsion polymerization of vinyl compounds, preferably vinyl esters, using the redoxcatalyst system of the invention.

The amount of oxidizing agent used, based on the total mass of the monomers employed in the emulsion polymerization, is preferably from 0.005 to 3%, in particular from 0.01 to 0.1%.

The total mass of the reducing components, based on the total mass of the monomers being employed in the emulsion polymerization, is preferably from 0.01 to 4% by weight, in particular from 0.1 to 1.2% by weight.

Preferably, the polymers prepared using the redoxcatalyst system of the invention are homopolymers or copolymers of vinyl esters comprising the following monomer groups:

a) vinyl esters, in particular, those vinyl esters having from 1 to 18 carbon atoms in the acid radical, for example, vinyl formate, vinyl acetate, vinyl propionate, vinyl isobutyrate, vinyl pivalate, vinyl 2-ethylhexanoate, vinyl esters of saturated, branched monocarboxylic acids having from 9 to 10 carbon atoms in the acid radical, vinyl esters of relatively long-chain, saturated or unsaturated fatty acids, for example, vinyl laurate, vinyl stearate, and also vinyl esters of benzoic acid and substituted derivatives of benzoic acid, for example, vinyl p-tert-butylbenzoate. Among these, particular preference is given to the exclusive use of vinyl acetate to form a homopolymer. Alternately, other vinyl esters mentioned can be copolymerized with vinyl acetate to a proportion of preferably 50% by weight. The total proportion of all vinyl esters in the polymer is preferably at least 50% by weight, in particular, from 75 to 100% by weight.

b) $\alpha,\beta$-unsaturated carboxylic acids, for example, acrylic acid, methacrylic acid, and also their esters with primary and secondary saturated monohydric alcohols having from 1 to 18 carbon atoms, for example, methanol, ethanol, propanol, butanol, 2-ethylhexanol, cycloaliphatic alcohols and also relatively long-chain fatty alcohols. Furthermore, $\alpha,\beta$-unsaturated dicarboxylic acids, such as maleic acid, fumaric acid, itaconic acid or citraconic acid, and also the monoesters or diesters of such acids with saturated monohydric aliphatic alcohols having from 1 to 18 carbon atoms can be copolymerized. The proportion of these comonomers, based on the total amount of monomers, is preferably up to 25% by weight, most preferably from 1 to 15% by weight.

c) ethylenically unsaturated hydrocarbons such as ethylene or $\alpha$-olefins having from 3 to 18 carbon atoms, for example, propylene, butylene, also styrene, vinyltoluene, vinylxylene, and also halogenated unsaturated aliphatic hydrocarbons, such as vinyl chloride, vinyl fluoride, vinylidene chloride and vinylidene fluoride. The proportion of these comonomers, based on the total amount of monomers, is preferably up to 50% by weight, most preferably from 1 to 25% by weight.

d) multiply ethylenically unsaturated monomers, for example, diallyl phthalate, diallyl maleate, triallyl cyanurate, tetraallyloxyethane, divinylbenzene, 1,4-butanediol dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate. The proportion of monomers from this group is preferably up to 10% by weight, most preferably from 0.01 to 2% by weight.

e) nitrogen-functional monomers such as (meth) acrylamide, allyl carbamate, acrylonitrile, N-methylol (meth)acrylamide, allyl N-methylolcarbamate and also the N-methylolesters, alkylethers or mannich bases of N-methylol(meth)acrylamide, or allyl N-methylolcarbamate, acrylamidoglycollic acid, methyl acrylamidomethoxyacetate, N-(2,2-dimethoxy-1-hydroxyethyl)acrylamide, N-dimethylaminopropyl(meth) acrylamide, N-alkyl(meth)acrylamides, p-hydroxyphenyl (meth)acrylamide, N-(3-hydroxy-2,2-dimethylpropyl) methacrylamide, ethylimidazolidone methacrylate, N-vinylformamide, N-vinylpyrrolidone. The proportion of these comonomers, based on the total amount of monomers, is preferably up to 15% by weight, most preferably from 0.1 to 10% by weight.

f) hydroxy-functional monomers such as hydroxyethyl (meth)acrylate, hydroxypropyl (meth)acrylate and also their adducts with ethylene oxide or propylene oxide. The proportion of these comonomers, based on the total amount of monomers, is preferably up to 25% by weight, most preferably from 0.1 to 15% by weight.

g) comonomers which are self-crosslinking or can be crosslinked via carbonyl groups. Suitable comonomers of this group include those selected from the group consisting of diacetoneacrylamide, allyl acetoacetate, vinyl acetoacetate and acetoacetoxyethyl (meth)acrylate. The proportion of these comonomers, based on the total amount of monomers, is preferably up to 10% by weight, most preferably from 0.01 to 5% by weight.

The preferred proportion of the comonomer units of the groups b) to g) present in the polymer, in addition to the vinyl ester units, may together total up to 50% by weight.

The dispersions prepared using the redox catalyst system of the invention may be stabilized, in particular, by polymeric stabilizers such as protective colloids. An example of a suitable stabilizer is polyvinyl alcohol, in particular polyvinyl alcohol having a preferred degree of hydrolysis from 60 to 100 mol %, most preferably from 70 to 98 mol %, and having a preferred viscosity of a 4% strength by weight aqueous solutions at 20° C. of from 2 to 70 mpa.s.

As protective colloids, it is also possible to use natural or synthetic polymers, such as derivatives of polyvinyl alcohols, etherified cellulose derivatives, for example, hydroxyethylcellulose or carboxymethylcellulose. These polymers can be used either alone or in combination with polyvinyl alcohol. Likewise suitable are polyvinylpyrrolidone, starches, dextrin, guar, alginates, proteins such as casein or gelatine, polycarboxylic acids such as poly (meth)acrylic acid, poly(methacrylamide) and also copolymers of maleic acid or maleic anhydride with ethylenically unsaturated compounds, such as methyl vinyl ether or styrene. Based on the solids content of the polymer, the proportion of the protective colloids is preferably from 1 to 20% by weight, and in particular from 2 to 13% by weight.

In addition to the protective colloids, nonionic and/or anionic emulsifiers can be concomitantly used in the polymerization mixture. If employed, the emulsifiers are preferably present in an amount of preferably up to 10% by weight, most preferably from 0.1 to 2% by weight, based on the solids content of the polymer. Examples of such emulsifiers include alkyl aryl polyglycol ethers and alkyl polyglycol ethers each preferably having from 8 to 50 mol of ethylene oxide units per molecule, block copolymers of ethylene oxide with propylene oxide, alkylsulfonates or alkyarylsulfonates, alkyl sulfates, alkyl and aryl ether sulfates and phosphates each having preferably from 8 to 18 carbon atoms in the lipophilic part and up to 50 ethylene oxide or propylene oxide units in the hydrophilic part, and also monoesters or diesters of sulfosuccinic acid or alkylphenols each having preferably from 8 to 18 carbon atoms in the alkyl radical.

The preparation according to the invention of the dispersions can in principle be carried out using a conventional continuous or discontinuous processes of free-radical emulsion polymerization. The polymerization may be conducted with the assistance of customary reaction vessels such as loop or stirred reactors. Preference is given to using discontinuous processes such as batch, combined batch/feed stream, pure feed stream processes or feed stream processes onto nucleating particles. Particular preference is given to a pure monomer feed stream process.

Of the individual components of the redox catalyst system, viz. the oxidizing agents and the novel bisulfite adducts, preferably at least one component, and most preferably both components, are metered in during the polymerization in the form of aqueous feed streams. The bisulfite adducts can also be prepared in situ by reaction of free polyfunctional aldehydes with alkali metal pyrosulfites or alkali metal hydrogen sulfites, either in an aqueous solution of the feed stream or directly in the dispersion during the polymerization.

If the reducing component comprises one or more further reducing components in addition to the instant bisulfite adduct, such additional reducing components are preferably metered in together with the masked polyfunctional aldehydes. To start the polymerization, small amounts, preferably<20% by weight of the total amount, of the oxidizing and/or reducing agents can be initially charged together in the polymerization mixture.

The polymerization is preferably carried out at a pH at which substantially no pH-related dissociation of the bisulfite adduct takes place under the polymerization conditions. This range generally lies above a pH of 4, preferably above a value of 4.5, and in particular above 5. To maintain this pH, customary buffer salts such as alkali metal acetates, phosphates and carbonates can be used.

The reaction temperature during the entire reaction is preferably from 0° C. to 100° C., most preferably from 30° to 95° C., and in particular from 45° to 90° C.

The invention also provides a polymer dispersion which can be obtained by the process of the invention.

The polymer dispersions prepared according to the present invention are generally finely divided, stable and coagulum-free. The solids content of the dispersion of the invention is preferably from 20 to 65% by weight, in particular from 30 to 60% by weight, based on the total weight of the dispersion. The polymer dispersions prepared according to the invention contain masked aldehyde groups which have been introduced via the redoxcatalyst system and are bound to the emulsion polymer and are capable of crosslinking.

The polymer dispersions prepared according to the invention can also be spray or freeze dried. In addition, customary additives such as anticaking agents can be added if necessary. In the case of spray drying, the temperature of the carrier gas is preferably selected such that substantially no thermal dissociation of the aldehyde groups blocked as a bisulfite adduct occurs. The dispersion powders obtained can be redispersed to again give aqueous polymer dispersions. Those skilled in the art are familiar with the processes required for this purpose.

The polymer dispersion is preferably activated by addition of an acid compound which can be complexed by the protective colloid polyvinyl alcohol, in particular an aqueous solution of aluminum chloride, aluminum nitrate, zirconium oxychloride of phosphoric acid. The acid component is preferably employed in an amount from 1 to 10% by weight, based on the dispersion. The pH of the polymer dispersion modified in this way is preferably from 2.5 to 4.

The films derived from polyvinyl ester dispersions stabilized with polyvinyl alcohol as protective colloid and prepared using the redoxcatalyst system of the invention as polymerization initiator generally have superior water resistance without the concomitant use of possibly formaldehyde-releasing, crosslinkable comonomers or subsequent additions of possibly formaldehyde-releasing crosslinking agents in the presence of acid compounds which can complex the protective colloid, such as aluminum (III) salts. This effect is particularly noted dispersion based on polyvinyl acetate. Further customary additives can be added to the dispersion of the invention, if desired. For example, further neutralizing agents, film-forming auxiliaries for lowering the minimum film-forming temperature, plasticizers, antifoamers, fillers and preservatives may be added.

The invention further provides for the use of the dispersions of the invention as adhesives, in particular for semi-porous and porous substrates, preferably for adhesive bonding of wood in accordance with specific industry standards. In this regard, adhesives prepared according to the present invention have achieved the quality class D4 of the test standard DIN EN 204.

Adhesive bonds produced from polyvinyl ester dispersions prepared with the aid of the catalyst system of the invention have a superior water resistance. When used as wood glue in accordance with the test standard DIN EN 204, they therefore generally meet at least the requirements of performance group D2, preferably D3, and in particular the test standard D4. The acid-activated polyvinyl ester dispersions are thus particularly suitable for use in interior spaces having extreme temperature and humidity fluctuations and subject to the action of water, for example, in indoor swimming pools and shower cubicles. In addition, the present dispersion may be used for exterior applications subjected to great climatic influences, for example, for windows and external doors. Furthermore, they have excellent utility for high frequency gluing.

Further examples of applications include water-resistant adhesive bonding of paper, cardboard, corrugated cardboard, foam material, cement, leather, textiles or pressed laminates, as a floor, wall or ceiling adhesive or as a furniture veneer adhesive or carpet adhesive, as water-resistant binders for wood fiberboards or artificial leather and also as binders for insulation materials made of paper fibers or synthetic fibers or as binders for textiles and nonwovens.

The following examples illustrate the invention. All parts and percentages are by weight unless indicated otherwise.

EXAMPLES

Bisulfite adducts of bifunctional aldehydes used as reducing components for Examples 1–3 and Comparative Example 1.

Commercially available samples of glutaraldehydebis (sodium hydrogen sulfite) (for Examples 1 and 2) and glyoxalbis(sodium hydrogen sulfite) monohydrate (for Comparative Example 1) were used.

Succinaldehydebis(sodium hydrogen sulfite) (for Example 3) and butyraldehyde(sodium hydrogen sulfite) (for Comparative Example 3) were prepared by an appropriate method by reacting succinaldehyde or butyraldehyde with sodium hydrogen sulfite in an aqueous solution, precipitated by addition of methanol, washed with methanol and dried at room temperature in vacuum. Iodometric analysis indicated the following compositions for the products:

TABLE 1

Iodometric analysis of the bisulfite adducts used:

| Product | Content of bisulfite adduct | Content of free NaHSO$_3$ |
|---|---|---|
| Glyoxalbis (sodium hydrogen sulfate) monohydrate | 91.5% | 2.8% |
| Succinaldehydebis- (sodium hydrogen sulfite) | >99% | Not able to be determined |
| Glutaraldehydebis (sodium hydrogen sulfite) | 98.3% | 0.53% |
| Butyraldehyde (sodium hydrogen sulfite) | 92.8% | 0.30% |

EXAMPLE 1

A 10 l stirred glass reactor with anchor stirrer and provided with feed inlets, reflux condenser, jacket heating and cooling is charged with a polymerization mixture consisting of 400 g of ®Mowiol 18-88 (Hoechst AG, partially saponified polyvinyl alcohol having a degree of hydrolysis of 88 mol %), 5.5 g of sodium acetate and 3.5 g of ®Agitan 280 (Munzing-Chemie, antifoam) in 3510 g of deionized water. The mixture has a pH of 5.7. A solution of 0.32 g of glutaraldehydebis(sodium hydrogen sulfite) in 12.8 g of water is added to the mixture and the reactor is heated. At an internal temperature of 57° C., 350 g of vinyl acetate are emulsified into the mixture. At an internal temperature of 60° C., the polymerization is started by addition of a solution of 0.16 g of tert-butyl hydroperoxide (t-BHP, 70% strength in water) in 26.2 g of water. As soon as the mixture has reached an internal temperature of 67° C., 4 separate feed streams are metered in linearly over a period of 3 hours.

| Feed stream 1: | 3650 g of vinyl acetate |
| Feed stream 2: | 31.7 g of glutaraldehydebis (sodium hydrogen sulfite) and 1.1 g of NaHCO$_3$ in 167.1 g of water |
| Feed stream 3: | 1.45 g of tert-butyl hydroperoxide (70% strength in water) in 198.55 g of water |
| Feed stream 4: | 15 g of NaHCO$_3$ in 170 g of water |

By controlling the jacket temperature, the polymerization is carried out in such a way that gentle reflux is maintained and the internal temperature gradually rises during the feed stream addition from 67° C. to about 80° C. After the feed stream additions are complete, polymerization is continued for a further hour at 80° C. and monomers are subsequently removed by additions of aqueous solutions of 5.4 g of hydrogen peroxide (30% strength) and 1.6 g of ascorbic acid. Subsequently, the pH which has dropped somewhat is adjusted from 5.2 to at least 6 using 10% strength sodium hydroxide solution (consumption about 60 g) and 2% of butyl diglycol acetate stirred in as film-forming auxiliary. This gave a coagulum-free dispersion having a solids content of 51.7% and a Brookfield RVT 6/20 viscosity (23° C.) of 26.3 Pa.s.

Example 2

A dispersion was prepared using the formulation of Example 1, except that only 0.16 g of glutarldehydebis (sodium hydrogen sulfite) was used for initiation in the mixture and that the feed stream 2 was a solution of 15.8 g of glutaraldehydebis(sodium hydrogen sulfite) containing 1.1 g of NaHCO$_3$ in 167.1 g of water. This gave a coagulum-free dispersion having a solids content of 51.7% and a Brookfield RVT 6/20 viscosity (23° C.) of 26.9 Pa.s.

Example 3

A dispersion was prepared using the formulation of Example 1, except that 0.30 g of succinaldehydebis(sodium hydrogen sulfite) was used for initiation in the mixture and that feed stream 2 was a solution of 29.73 g of succinaldehydebis (sodium hydrogen sulfite) containing 0.27 g of NaHCO$_3$ in 167.1 g of water. This gave a coagulum-free dispersion having a solids content of 52% and a Brookfield RVT 6/20 viscosity (23° C.) of 31.1 Pa.s.

Comparative Example 1

A dispersion was prepared using a method similar to Example 1, except that glyoxalbis(sodium hydrogen sulfite) monohydrate was used as reducing agent. Initiation was carried out using 0.30 g of glyoxalbis(sodium hydrogen sulfite) monohydrate and the feed stream 2 used was a solution of 29.4 g of glyoxalbis(sodium hydrogen sulfite) monohydrate and 0.73 g of NaHCO$_3$ in 330.1 g of water. A pH of 6.25 was set using 112.6 g of 10% strength NaOH instead of about 60 g of 10% strength NaOH. The result obtained was a coagulum-free dispersion having a solids content of 49.6% and a Brookfield RVT 6/20 viscosity (23° C.) of 15.1 Pa.s.

Comparative Example 2

A dispersion was prepared using a method similar to Example 1, except that sodium hydrogen sulfite (formed from sodium pyrosulfite) was used as reducing agent. Initiation was carried out using 0.014 g of sodium pyrosulfite and the feed stream 2 used was a solution of 1.43 g of sodium pyrosulfite and 0.83 g of NaHCO$_3$ in 167.1 g of water, with the addition of this feed stream and that of feed stream 3 being commenced somewhat earlier than that of the monomer feed stream 1. The result obtained was a coagulum-free dispersion having a solids content of 51.5% and a Brookfield RVT 6/20 viscosity (23° C.) of 26.0 Pa.s.

Comparative Example 3

A dispersion was prepared using a method similar to Example 1, except that butyraldehyde(sodium hydrogen sulfite) was used as reducing agent. Initiation was carried out using 0.39 g of butyraldehyde(sodium hydrogen sulfite) and the feed stream 2 used was a solution of 38.4 g of butyraldehyde(sodium hydrogen sulfite) and 1.88 g of NaHCO$_3$ in 167.1 g of water. A pH of 6 was set using about 60 g of 10% strength NaOH. The result obtained was a coagulum-free dispersion having a solids content of 52.7% and a Brookfield RVT 6/20 viscosity (23° C.) of 22.2 Pa.s.

Testing of the polyvinyl acetate dispersions as wood adhesive 100 parts of each of the dispersions from the examples were admixed with 5 parts of a 28% strength solution of aluminum chloride in water. Testing as wood glue was carried out in accordance with DIN EN 204/D4. The test specimens were produced in accordance with the procedure of DIN EN 205. Gluing and testing were carried out under the following conditions:

| | |
|---|---|
| Maturing period after AlCl$_3$ addition: | 2 hours |
| Glue application: | 150 ± 20 g/m$^2$ on both sides |
| Open waiting time: | 3 minutes |
| Closed waiting time: | 3 minutes |
| Pressing time | 2 hours |
| Pressing pressure: | 0.7 ± 0.1 N/mm$^2$ |
| Number of test specimens per test sequence: | 20 |
| Storage sequence D4/5: | 7 days under standard conditions of temperature and humidity*) 6 hours in boiling water 2 hours in cold water |
| Test temperature: | 23° C. ± 2° C. |
| Rate of advance: | 50 mm/min |

Classification in the performance group D4/5 is at a tensile strength of >4 N/mm$^2$.

Standard conditions of temperature and humidity:*) 23±2° C. and 50±5% relative atmospheric humidity.

The values obtained for the wet adhesive strengths are shown in Table 2. This table likewise shows the amounts of the components used in the catalyst systems employed in the examples. (The figures are based on 1 kg of monomer.)

TABLE 2

Catalyst systems and wet adhesive strengths of the dispersions

| Example | NaHSO$_3$ (bis)adduct of | t-BHP [mmol] | NaHSO$_3$ (bis)adduct [mmol] | free NaHSO$_3$ [mmol] | D4/5 [N/mm$^2$] |
|---|---|---|---|---|---|
| 1 | Glutaraldehyde | 3.13 | 25.54 | 0.41 | 5.5 |
| 2 | Glutaraldehyde | 3.13 | 12.77 | 0.205 | 3.9 |
| 3 | Succinaldehyde | 3.13 | 25.54 | — | 4.6 |
| C1 | Glyoxal | 3.13 | 25.54 | 2 | 0.5 |
| C2 | — | 3.13 | — | 3.8 | all test specimens had disintegrated |
| C3 | Butyraldehyde | 3.13 | 51.08 | 0.28 | all test specimens had disintegrated |

It can be seen from this table that the adhesive bonds formed by the films derived from the dispersions of Examples 1 to 3 according to the invention have a high degree of resistance to boiling water which is dependent on the amount of bisulfite adduct. Examples 1 and 3 easily pass the requirements of the storage sequence D4/5 for the boiling water resistance of the adhesive bonds of the test standard DIN EN 204 D4. Comparative Example C1 which is not according to the invention, shows that the product prepared using equivalent amounts of glyoxalbis(sodium hydrogen sulfite) as constituent of the reducing agent system is far short of the requirements of the test standard and does not lead to a solution of the object of the invention. The exclusive use of sodium hydrogen sulfite as reducing agent in Comparative Example C2 produces no effect in respect of the water resistance. The use of an amount of butyraldehyde (sodium hydrogen sulfite) as a representative of the bisulfite adducts of monofunctional aldehydes having an identical number of carbon atoms to the succinaldehyde used in Example 3, which is twice the molar amount (and thus the equivalent amount) of the aldehyde adducts used in Examples 1 and 3 likewise produces, in the Comparative Example C3 which is not according to the invention, no effect to the desired extent in respect of the water resistance of the adhesive joints.

Free formaldehyde

The detection of free formaldehyde was carried out UV/vis spectrometrically in the centrifuge liquor of the dispersions not modified with aluminum chloride from the Examples 1 to 3 according to the invention by means of the acetylacetone method. (For the preparation of the acetylacetone reagent solution, see H. Petersen and N. Petri, Melliand Textilberichte 66, 363 (1985)). The values shown below were all in the vicinity of the detection limit:

TABLE 3

Free formaldehyde contents of the dispersions from Examples 1–3:

| Example | free HCHO |
|---|---|
| 1 | 3 ppm |
| 2 | 5 ppm |
| 3 | 2 ppm |

The priority document, German Application 195 45 609.2, filed Dec. 7, 1995, is incorporated herein by reference in its entirety including the title, abstract, specification, and claims.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A redoxcatalyst capable of being used for free-radical emulsion polymerization of ethylenically unsaturated compounds, comprising at least one oxidizing agent and at least one reducing agent, said reducing agent comprising an at least bifunctional aldehyde having at least 3 carbon atoms which is completely masked as a bisulfite adduct.

2. A redoxcatalyst as claimed in claim 1, wherein said oxidizing agent comprises an organic hydroperoxide.

3. A redoxcatalyst as claimed in claim 1, wherein said reducing agent comprises a water-soluble or water-suspendable bis(alkali metal hydrogen sulfite) adduct.

4. A redoxcatalyst as claimed in claim 1, comprising tert-butyl hydroperoxide and a reducing agent selected from the group consisting of glutaraldehydebis(sodium hydrogen sulfite) and succinaldehydebis(sodium hydrogen sulfite).

5. A redoxcatalyst as claimed in claim 1, wherein the molar ratio of the oxidizing groups in the oxidizing agent to the reducing groups in the reducing agent ranges from 1:0.01 to 1:100.

6. A redoxcatalyst as claimed in claim 1, wherein the oxidizing agent is a water-soluble compounds containing at least one azo or peroxide group.

7. A redoxcatalyst as claimed in claim 1, wherein said oxidizing agent is selected from the group consisting of azobisisobutyonitrile, hydrogen peroxide, peroxodiphosphates, peroxosulfates, peroxodisulfates, organic hydroperoxides, and mixtures thereof.

8. A redoxcatalyst as claimed in claim 1, wherein said reducing agent comprises at least one adduct of malonaldehyde, succinaldehyde, 2-hydroxysuccinaldehyde, glutaraldehyde, 3-methylglutaraldehyde, 3-hydroxyglutaraldehyde, adipaldehyde, heptanedial, octanedial, nonanedial, decanedial, cis- and trans-2-butenedial, polyadducts of alkali metal hydrogen sulfites, polyacrolein or dialdehyde starches.

9. A redoxcatalyst as claimed in claim 1, wherein in addition to said bifunctional aldehyde having at least 3 carbon atoms which is completely masked as a bisulfite adduct, there is also included a further reducing agent.

10. A process for preparing polymer dispersions by emulsion polymerization of vinyl compounds comprising conducting a continuous or discontinuous free-radical polymerization employing the redox catalyst system as claimed in claim 1.

11. A process as claimed in claim 10, wherein said vinyl compounds comprise vinyl esters having from 1 to 18 carbon atoms in an acid radical.

12. A process as claimed in claim 10, wherein the oxidizing agent and the reducing agent of the redoxcatalyst are metered in parallel via separate feed streams.

* * * * *